United States Patent
Sivakumar et al.

(10) Patent No.: US 12,249,159 B2
(45) Date of Patent: Mar. 11, 2025

(54) SYSTEMS AND METHODS FOR DETECTING OBJECTS BASED ON LIDAR DATA

(71) Applicant: DENSO CORPORATION, Aichi (JP)

(72) Inventors: Prasanna Sivakumar, Pittsburgh, PA (US); Kris Kitani, Pittsburgh, PA (US); Matthew Patrick O'Toole, Pittsburgh, PA (US); Xinshuo Weng, Pittsburgh, PA (US); Shawn Hunt, Bethel Park, PA (US)

(73) Assignee: DENSO CORPORATION, Kariya (JP)

(*) Notice: Subject to any disclaimer, the term of this patent is extended or adjusted under 35 U.S.C. 154(b) by 570 days.

(21) Appl. No.: 17/708,745

(22) Filed: Mar. 30, 2022

(65) Prior Publication Data

US 2023/0112664 A1    Apr. 13, 2023

Related U.S. Application Data

(60) Provisional application No. 63/262,211, filed on Oct. 7, 2021.

(51) Int. Cl.
*G06V 20/58*     (2022.01)
*G01S 7/4914*    (2020.01)
*G01S 17/894*    (2020.01)
*G06V 10/44*     (2022.01)
*G06V 10/764*    (2022.01)

(52) U.S. Cl.
CPC ............ *G06V 20/58* (2022.01); *G01S 17/894* (2020.01); *G06V 10/454* (2022.01); *G06V 10/764* (2022.01); *G01S 7/4914* (2013.01)

(58) Field of Classification Search
CPC .... G06V 20/58; G06V 10/454; G06V 10/764; G01S 17/894; G01S 7/4914; G01S 7/4802; G01S 17/931; G01S 17/89; G06F 18/254

See application file for complete search history.

(56) References Cited

U.S. PATENT DOCUMENTS

| | | | |
|---|---|---|---|
| 10,634,793 B1* | 4/2020 | Siao | G06V 10/80 |
| 11,675,878 B1* | 6/2023 | Pandya | G01S 17/86 |
| | | | 382/103 |
| 11,803,955 B1* | 10/2023 | Pandya | G08B 29/186 |
| 12,118,780 B2* | 10/2024 | Zhou | G06V 20/176 |

(Continued)

*Primary Examiner* — Mia M Thomas
(74) *Attorney, Agent, or Firm* — Harness, Dickey & Pierce, P.L.C.

(57) ABSTRACT

A method includes generating a plurality of lidar inputs based on the lidar data, where each lidar input from among the plurality of lidar inputs comprises an image-based portion and a geometric-based portion, and where each lidar input from among the plurality of lidar inputs defines a position coordinate of the one or more objects. The method includes performing, for each lidar input from among the plurality of lidar inputs, a convolutional neural network (CNN) routine based on the image-based portion to generate one or more image-based outputs and assigning the plurality of lidar inputs to a plurality of echo groups based on the geometric-based portion. The method includes concatenating the one or more image-based outputs and the plurality of echo groups to generate a plurality of fused outputs and identifying the one or more objects based on the plurality of fused outputs.

20 Claims, 5 Drawing Sheets

(56) References Cited

U.S. PATENT DOCUMENTS

| | | | |
|---|---|---|---|
| 2013/0150717 A1* | 6/2013 | Sato | A61B 8/466 |
| | | | 600/443 |
| 2017/0140253 A1* | 5/2017 | Wshah | G06V 20/54 |
| 2017/0220854 A1* | 8/2017 | Yang | G06V 20/46 |
| 2018/0348374 A1* | 12/2018 | Laddha | G01S 17/931 |
| 2019/0163968 A1* | 5/2019 | Hua | G06V 20/58 |
| 2019/0204834 A1* | 7/2019 | Harrison | G01S 13/865 |
| 2019/0354782 A1* | 11/2019 | Kee | G06F 18/217 |
| 2020/0158869 A1* | 5/2020 | Amirloo Abolfathi | |
| | | | G06T 7/521 |
| 2020/0242382 A1* | 7/2020 | Yin | G06V 10/82 |
| 2020/0249316 A1* | 8/2020 | Harrison | G01S 13/931 |
| 2021/0133479 A1* | 5/2021 | Ma | G06N 3/045 |
| 2021/0208279 A1* | 7/2021 | Bravo Orellana | G01S 7/4802 |
| 2021/0247517 A1* | 8/2021 | Yelton | G06V 20/64 |
| 2021/0302583 A1* | 9/2021 | Agrawal | G01S 17/931 |
| 2022/0026573 A1* | 1/2022 | Baribault | G02B 27/0081 |
| 2022/0067419 A1* | 3/2022 | Yoo | G06V 10/44 |
| 2022/0114807 A1* | 4/2022 | Iancu | G06V 20/58 |
| 2022/0164934 A1* | 5/2022 | Gao | G06V 10/7747 |
| 2023/0140079 A1* | 5/2023 | Zhu | G06V 20/58 |
| | | | 382/103 |
| 2023/0282000 A1* | 9/2023 | Pang | G01S 7/412 |
| | | | 382/103 |
| 2023/0305160 A1* | 9/2023 | Li | G01S 13/862 |
| 2023/0328403 A1* | 10/2023 | Wang | H04N 25/20 |
| | | | 348/207.99 |
| 2024/0400088 A1* | 12/2024 | Hanasoge Shankaranarayana Rao | G06V 10/82 |

* cited by examiner

SYSTEMS AND METHODS FOR DETECTING OBJECTS BASED ON LIDAR DATA

CROSS-REFERENCE TO RELATED APPLICATION

This application is a U.S. Patent Application, which claims priority to, and the benefit of U.S. Provisional Patent Application No. 63/262,211 filed on Oct. 7, 2021. The disclosure of the above applications is incorporated herein by reference.

FIELD

The present disclosure relates to systems and methods for detecting objects based on lidar data.

BACKGROUND

The statements in this section merely provide background information related to the present disclosure and may not constitute prior art.

Autonomous and semi-autonomous vehicles use light detection and ranging (lidar) sensors to obtain three-dimensional (3D) data points representing objects in an environment surrounding the vehicle and to perform various lidar-based routines, such as a driver assistance routine, an adaptive cruise control routine, a braking routine, and/or an object detection/identification routine. However, the lidar-based routines may not accurately process and interpret the 3D data points to identify and detect contours of objects in an environment surrounding the vehicle, thereby inhibiting the accuracy of the lidar-based routines.

SUMMARY

This section provides a general summary of the disclosure and is not a comprehensive disclosure of its full scope or all of its features.

The present disclosure provides a method for detecting one or more objects based on lidar data obtained from a lidar sensor of a vehicle, where the lidar data corresponds to an ambient environment of the vehicle. The method includes generating a plurality of lidar inputs based on the lidar data, where each lidar input from among the plurality of lidar inputs comprises an image-based portion and a geometric-based portion, and where each lidar input from among the plurality of lidar inputs defines a position coordinate of the one or more objects. The method includes performing, for each lidar input from among the plurality of lidar inputs, a convolutional neural network (CNN) routine based on the image-based portion to generate one or more image-based outputs and assigning the plurality of lidar inputs to a plurality of echo groups based on the geometric-based portion. The method includes concatenating the one or more image-based outputs and the plurality of echo groups to generate a plurality of fused outputs and identifying the one or more objects based on the plurality of fused outputs.

In one form, the geometric-based portion defines a surface reflectance value associated with the position coordinate. In one form, the plurality of echo groups further comprise a first echo group associated with a first set of the plurality of lidar inputs having a first surface reflectance value and one or more additional echo groups associated with one or more additional sets of the plurality of lidar inputs having one or more additional surface reflectance values. In one form, assigning the plurality of lidar inputs to a plurality of echo groups based on the geometric-based portion further comprises performing, for each lidar input from among the plurality of lidar inputs, an artificial neural network (ANN) routine based on the geometric-based portion. In one form, the image-based portion defines a pixel value associated with the position coordinate, and the image-based portion defines at least one of a light intensity value and a surface reflectance value associated with the position coordinate.

In one form, performing the CNN routine based on the image-based portion to generate the one or more image-based outputs further comprises generating one or more bounding boxes, as the one or more image-based outputs, based on the image-based portion of the plurality of lidar inputs and determining an estimated object type associated with the one or more objects based on the one or more bounding boxes. In one form, identifying the one or more objects based on the plurality of fused outputs further comprises selectively adjusting the one or more bounding boxes based on a type of the plurality of fused outputs associated with the one or more bounding boxes and classifying, for each object from among the one or more objects, the object based on the estimated object type associated with the object and a bounding box from among the one or more bounding boxes, where the bounding box is associated with the object. In one form, the type of the plurality of fused outputs includes a penetrable type and an impenetrable type.

The present disclosure provides a system for detecting one or more objects based on lidar data obtained from a lidar sensor of a vehicle, where the lidar data corresponds to an ambient environment of the vehicle. The system includes one or more processors and one or more nontransitory computer-readable mediums storing instructions that are executable by the one or more processors. The instructions comprise generating a plurality of lidar inputs based on the lidar data, where each lidar input from among the plurality of lidar inputs comprises an image-based portion and a geometric-based portion, where each lidar input from among the plurality of lidar inputs defines a position coordinate of the one or more objects, and where the geometric-based portion defines a surface reflectance value associated with the position coordinate. The instructions include performing, for each lidar input from among the plurality of lidar inputs, a convolutional neural network (CNN) routine based on the image-based portion to generate one or more image-based outputs and performing, for each lidar input from among the plurality of lidar inputs, an artificial neural network (ANN) routine based on the geometric-based portion to generate a plurality of echo groups. The instructions include concatenating the one or more image-based outputs and the plurality of echo groups to generate a plurality of fused outputs and identifying the one or more objects based on the plurality of fused outputs.

The present disclosure provides a system for detecting one or more objects based on lidar data obtained from a lidar sensor of a vehicle, where the lidar data corresponds to an ambient environment of the vehicle. The system includes one or more processors and one or more nontransitory computer-readable mediums storing instructions that are executable by the one or more processors. The instructions comprise generating a plurality of lidar inputs based on the lidar data, where each lidar input from among the plurality of lidar inputs comprises an image-based portion and a geometric-based portion, where each lidar input from among the plurality of lidar inputs defines a position coordinate of the one or more objects, and where the image-based portion defines a pixel value associated with the position coordinate and at least one of a light intensity value and a surface reflectance value associated with the position coordinate. The instructions comprise performing, for each lidar input from among the plurality of lidar inputs, a convolutional neural network (CNN) routine based on the image-based portion to generate one or more image-based outputs and assigning the plurality of lidar inputs to a plurality of echo groups based on the geometric-based portion. The instructions comprise concatenating the one or more image-based outputs and the plurality of echo groups to generate a plurality of fused outputs and identifying the one or more objects based on the plurality of fused outputs.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
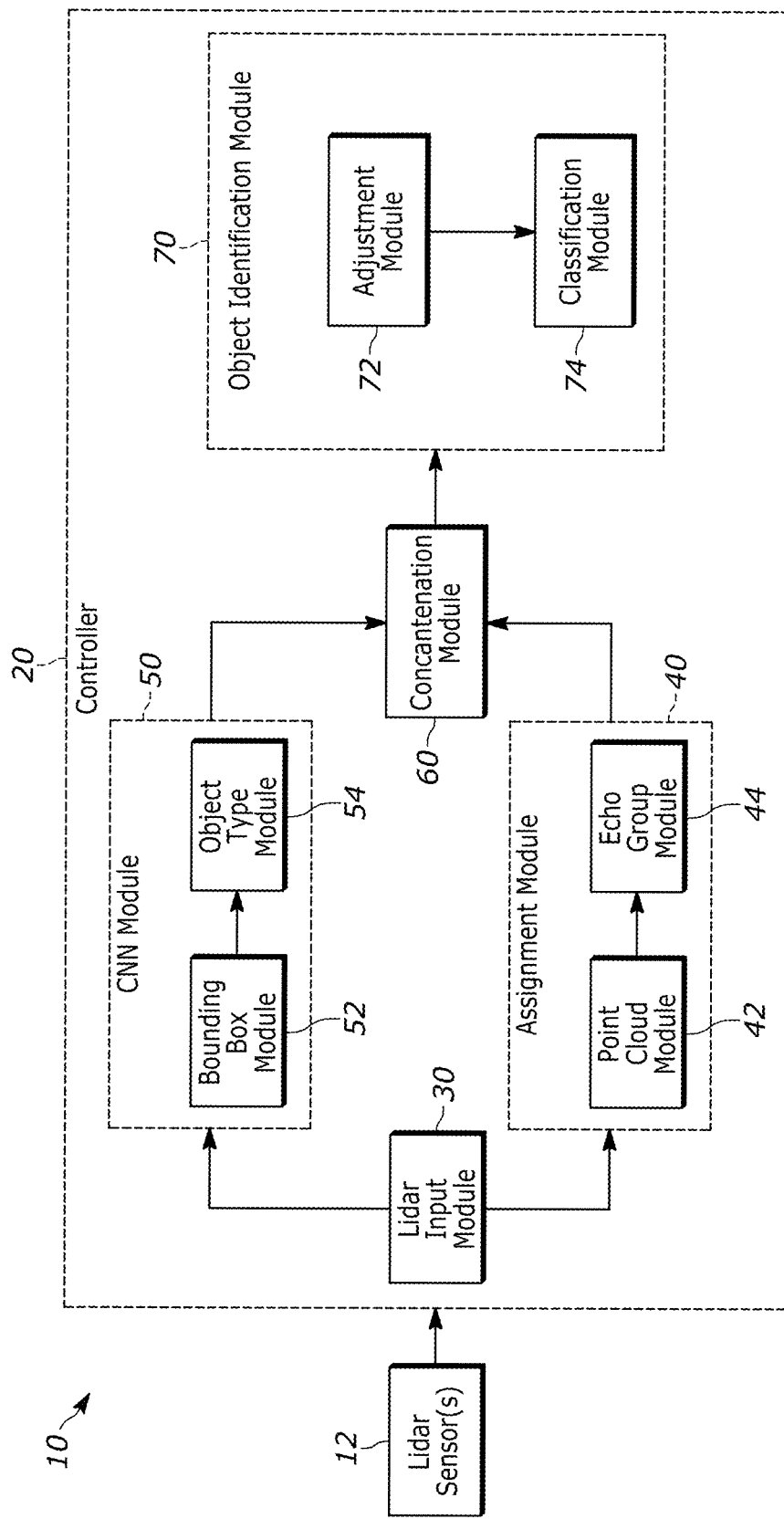
FIG. 1 is a functional block diagram of a vehicle in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides systems and methods for detecting objects based on lidar data obtained from, for example, a single photon avalanche diode (SPAD)-based lidar sensor and using multiple integrated machine learning modules. A controller generates lidar inputs based on the lidar data, where each lidar input includes an image-based portion and a geometric-based portion. The controller performs a convolutional neural network routine based on the image-based portion to generate one or more image-based outputs, and the controller assigns the lidar inputs to a plurality of echo groups based on the geometric-based portion based on an echo assignment routine. The controller concatenates the one or more image-based outputs and the plurality of echo groups to generate a plurality of fused outputs and identifies one or more objects proximate the vehicle. Accordingly, the multi-modality approach employed by the controller provides enhanced accuracy in detecting and identifying objects in an environment surrounding the vehicle.

Referring to FIG. 1, a vehicle 10 is shown and generally includes one or more lidar sensors 12 and a controller 20. In one form, the components of the vehicle 10 are communicably coupled by a vehicle communication network, such as a controlled area network (CAN), a local interconnect network (LIN), and/or other suitable communication networks.

In one form, the one or more lidar sensors 12 detect contours and ranges of various objects of an environment surrounding the vehicle 10 (hereinafter referred to as "the ambient environment"), such as traffic infrastructure, obstructions, pedestrians, other vehicles, among other objects surrounding the vehicle 10. Specifically, each of the one or more lidar sensors 12 includes a laser system that emits a laser, a photodetector system that obtains various reflection metrics associated with one or more reflected signals associated with the objects in the surrounding environment, such as a surface reflectance associated with the reflected signals, a light intensity value that is based on a luminosity of the environment surrounding the vehicle 10, and a surface reflectance value that is based on a signal strength of the reflected signals. In one form, the one or more lidar sensors 12 are provided by one or more SPAD-based lidar sensors.

In one form, the controller 20 includes a lidar input module 30, an assignment module 40, a convolutional neural network (CNN) module 50, a concatenation module 60, and an object identification module 70. In one form, the lidar input module 30 generates a plurality of lidar inputs based on the lidar data obtained from the one or more lidar sensors 12. In one form, each lidar input defines a position coordinate of the detected objects within the ambient environment. As an example, the position coordinate may be a polar representation of the detected objects that defines an azimuth and/or elevation of the detected objects and a range relative to the given lidar sensor 12. As another example, the position coordinate may be a cartesian representation of the detected objects that defines a three-dimensional (3D) cartesian coordinate of the detected object relative to the given lidar sensor 12.

In one form, the lidar input includes an image-based portion that is processed by the CNN module 50 and a geometric-based portion that is processed by the assignment module 40. The image-based portion defines a pixel value associated with the position coordinate, a light intensity value associated with the position coordinate, and/or a surface reflectance value associated with the position coordinate. The geometric-based portion defines the surface reflectance value associated with the position coordinate. In one form, the pixel value is a pixel coordinate associated with the position coordinate and within a field of view of the one or more lidar sensors 12, and the pixel coordinate is represented as, for example, a two-dimensional (2D) value. In one form, the light intensity value is an 8-bit value representing a luminosity of the detected object/contour at the given position coordinate (e.g., 0-255). In one form, the surface reflectance value is a value representing the signal strength of the reflected signal associated with the given position coordinate. An example table illustrating a plurality of lidar inputs is shown below in Table 1.

TABLE 1

Example Lidar Inputs

| Lidar Input | Position Coordinate | Pixel Value (Image-based portion) | Light Intensity Value (Image-based portion) | Surface Reflectance Value (Image-based portion and/or geometric-based portion) |
|---|---|---|---|---|
| $A_1$ | $x_1, y_1, z_1$ | $sx_1, sy_1$ | $Lm_1$ | $R_1$ |
| $A_2$ | $x_2, y_2, z_2$ | $sx_2, sy_2$ | $Lm_2$ | $R_2$ |
| $A_3$ | $x_3, y_3, z_3$ | $sx_3, sy_3$ | $Lm_3$ | $R_3$ |
| $A_4$ | $x_4, y_4, z_4$ | $sx_4, sy_4$ | $Lm_4$ | $R_4$ |

In table 1, A represents a given lidar input, (x, y, z) represents the cartesian coordinate of the object/contour, (sx, sy) represents the pixel coordinate of the object/contour in a frame/field of view relative to the lidar sensor(s) 12, Lm represents the light intensity value in lumens, and R represents the surface reflectance value.

Figure 2:
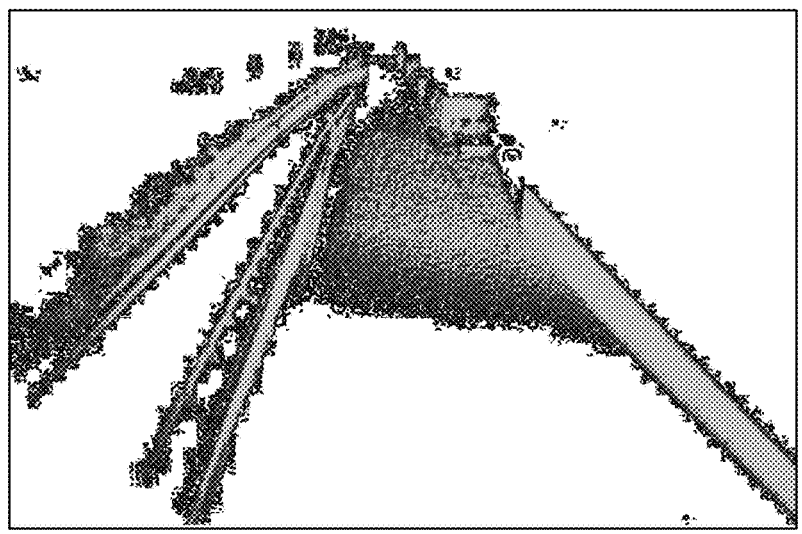
FIG. 2 illustrates a plurality of three-dimensional data points generated by a lidar sensor in accordance with the teachings of the present disclosure.

In one form, the assignment module 40 includes a point cloud module 42 and an echo group module 44. In one form, the point cloud module 42 generates a plurality of three-dimensional (3D) data points based on the lidar inputs using known lidar data point generation routines. As an example and as shown in FIG. 2, the point cloud module 42 is configured to generate 3D data points 80 based on the position coordinates associated with the lidar inputs and representing the contours, surfaces, and ranges of various objects surrounding the vehicle 10.

In one form, the echo group module 44 assigns the plurality of 3D data points 80 to a plurality of echo groups based on the geometric-based portion of the lidar inputs (i.e., the surface reflectance value associated with the position coordinate). As used herein, "echo group" refers to a set of 3D data points 80 having the same (or approximately the same) surface reflectance values. In one form, each echo group is associated with a unique surface reflectance value (i.e., each 3D data point 80 of a first echo group has a first surface reflectance value, each 3D data point 80 of a second echo group has a second surface reflectance value, and so on). In one form, the light intensity and/or surface reflectance values of the 3D data points 80 of a given echo group may be equal or unequal.

Figure 3:
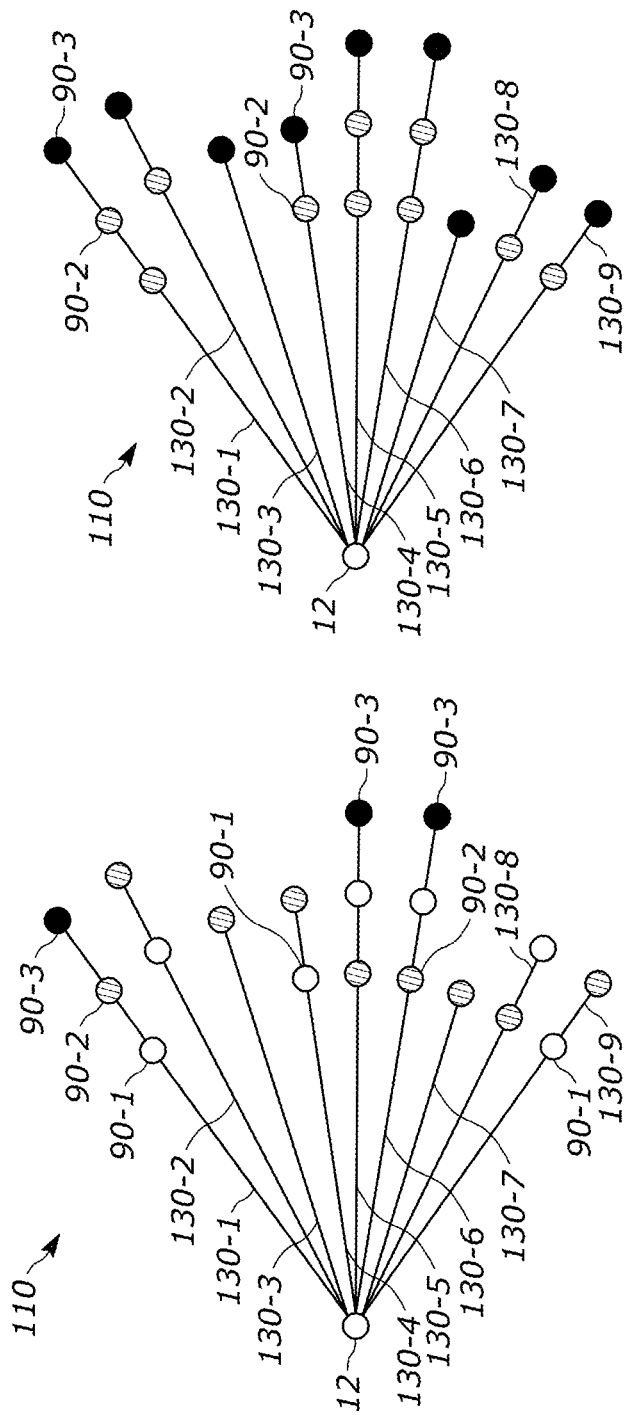
FIG. 3A illustrates a plurality of echo groups in accordance with the teachings of the present disclosure.
FIG. 3B illustrates a plurality of echo groups that are subjected to an echo group reassignment routine in accordance with the teachings of the present disclosure.

As an example and referring to FIGS. 1 and 3A, the echo group module 44 may generate a first echo group 90-1 representing a set of 3D data points 80 associated with a first surface reflectance value, a second echo group 90-2 representing a set of 3D data points 80 associated with a second surface reflectance value, and a third echo group 90-3 representing a set of 3D data points 80 associated with a third surface reflectance value. In one form, the first surface reflectance value is less than the second surface reflectance value, and the second surface reflectance value is less than the third surface reflectance value. The first, second, and third echo groups 90-1, 90-2, 90-3 are collectively referred to hereinafter as the "echo groups 90." It should be understood that the echo group module 44 may assign the 3D data points 80 to any number of echo groups 90 and is not limited to the examples described herein.

In one form, the echo group module 44 assigns the echo groups 90 to one of a penetrable set and an impenetrable set based on a penetrable group identification routine. As an example and referring to FIGS. 1 and 3A-3B, the echo group module 44 correlates laser beams 100-1, 100-2, 100-3, 100-4, 100-5, 100-6, 100-7, 100-8, 100-9 (collectively referred to hereinafter as "laser beams 100") emitted by the one or more lidar sensors 12 to the resulting 3D data points 80 and identified echo groups 90. Subsequently, for each of the laser beams 100, the echo group module 44 assigns the 3D data point 80 that is furthest from the one or more lidar sensors 12 to the impenetrable set and the remaining 3D data points 80 to the penetrable set. In one form, the penetrable set of echo groups 90 and/or 3D data points 80 are associated with contours of a detected object and/or a reflection of a semi-transparent surface of the detected object. As described below in further detail, the object identification module 70 is configured to identify the one or more objects in the ambient environment based on the echo groups 90 that are assigned to penetrable set.

In one form, the echo group module 44 assigns the plurality of 3D data points 80 to the plurality of echo groups 90 and/or assigns the echo groups 90 to the penetrable/impenetrable sets based on the geometric-based portion and an artificial neural network (ANN) routine. As an example, the echo group module 44 may include a multilayer perceptron network (e.g., a PointNet++ neural network or other known open-source projects) that includes a sampling layer configured to identify one or more centroids of the plurality of 3D data points 80 based on an iterative farthest point sampling routine. The multilayer perceptron network includes a grouping layer that locates 3D data points 80 proximate the one or more centroids and a PointNet layer that identifies the features associated with the 3D data points 80 (e.g., the surface reflectance value associated with the position coordinate). The multilayer perceptron network may also include a segmentation network and/or a classification network that assign the plurality of 3D data points 80 to the echo groups 90 (and optionally assign the echo groups 90 to the penetrable/impenetrable sets) based on the features identified by the PointNet layer. It should be understood that the echo group module 44 may include other ANN architectures to assign the plurality of 3D data points 80 to the plurality of echo groups 90 and/or assign the echo groups 90 to the penetrable/impenetrable sets and is not limited to the example described herein.

In one form, the CNN module 50 performs a CNN routine based on the image-based portion of the lidar inputs to generate one or more image-based outputs. In one form, the CNN module 50 includes a bounding box module 52 and an object type module 54. While CNN routines are described herein, it should be understood that the CNN module 50 may be replaced with other networks, systems, and/or modules configured to perform the morphological operations described herein, such as a computer vision system.

The bounding box module 52 may generate one or more bounding boxes based on the image-based portion of the lidar inputs. Specifically, the bounding box module 52 generates bounding boxes (e.g., rotated bounding boxes or non-rotated bounding boxes) that surround detected objects of the ambient environment. As an example, the bounding box module 52 is implemented by a CNN routine or other deep learning neural network routine that is configured to generate the one or more bounding boxes by performing known semantic segmentation routines and bounding box generation routines.

In one form, the object type module 54 determines an estimated object type associated with the one or more detected objects based on the bounding boxes. As an example, the object type module 54 determines one or more metrics associated with the bounding boxes using known image processing routines (e.g., a difference-based image processing routine, a semantic-based image processing routine, pixel conversion routines, among others). Example metrics include, but are not limited to: a positional relationship between edges, such as a distance and/or angular displacement, the area of the bounding boxes, and/or the length/width of the bounding boxes.

ing the type of detected object (i.e., the one or more image-based outputs 130), the 3D data points 80 having a position coordinate within the given bounding box 110 and the respective echo group 90, as shown below in Table 2.

TABLE 2

Example Fused Outputs

| Fused Output | Image-based Output | Bounding Box | Estimated Object Type | Echo Group | Penetrable/ Impenetrable Set | 3D data points |
|---|---|---|---|---|---|---|
| $140_1$ | $130_1$ | $110_1$ | Bicyclist | $90_1$ | Penetrable | $80_1$-$80_{39}$ |
| $140_2$ | $130_1$ | $110_1$ | Bicyclist | $90_2$ | Impenetrable | $80_{40}$-$80_{75}$ |
| $140_3$ | $130_2$ | $110_2$ | Pedestrian | $90_1$ | Penetrable | $80_{101}$-$80_{143}$ |
| $140_4$ | $130_2$ | $110_2$ | Pedestrian | $90_2$ | Impenetrable | $80_{143}$-$80_{170}$ |
| $140_5$ | $130_3$ | $110_3$ | Vehicle | $90_1$ | Penetrable | $80_{190}$-$80_{252}$ |
| $140_6$ | $130_3$ | $110_3$ | Vehicle | $90_2$ | Impenetrable | $80_{260}$-$80_{302}$ |
| $140_7$ | $130_4$ | $110_4$ | Building | $90_1$ | Penetrable | $80_{313}$-$80_{555}$ |
| $140_8$ | $130_4$ | $110_4$ | Building | $90_2$ | Impenetrable | $80_{563}$-$80_{765}$ |

Figure 4:
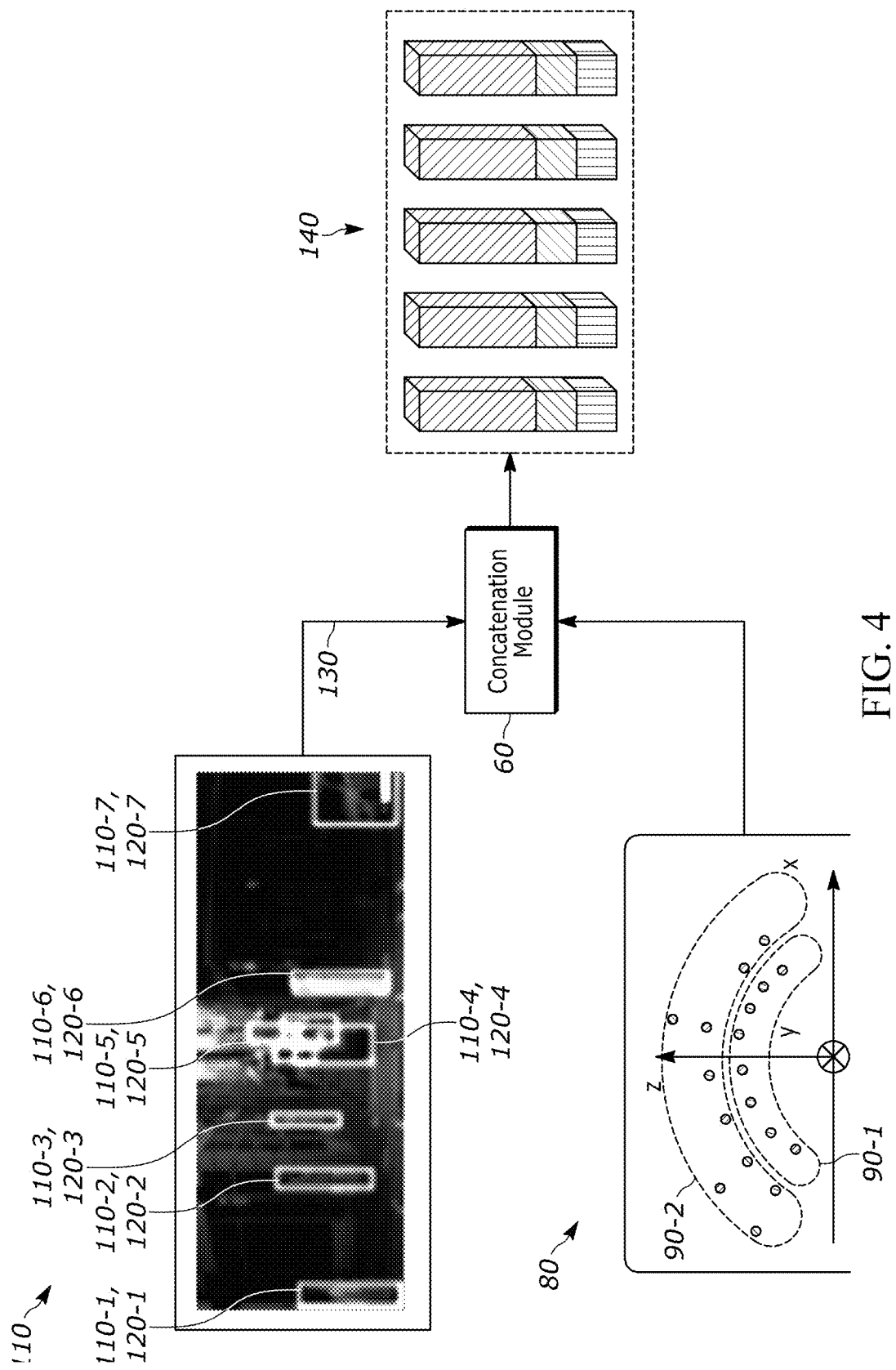
FIG. 4 illustrates a fused output generated by a controller of the vehicle in accordance with the teachings of the present disclosure.

As a specific example and referring to FIGS. 1 and 4, the bounding box module 52 generates bounding boxes 110-1, 110-2, 110-3, 110-4, 110-5, 110-6, 110-7 (collectively referred to hereinafter as "bounding boxes 110") corresponding to detected objects 120-1, 120-2, 120-3, 120-4, 120-5, 120-6, 120-7 (collectively referred to hereinafter as "objects 120"), respectively. Subsequently, the object type module 54 calculates various metrics of the bounding boxes and identifies the type of object by correlating the metrics to an object-metric table defined during a training routine of the CNN 50, such as a person, another vehicle, a bicyclist, traffic infrastructure, etc. The object type module 54 then generates one or more vectors corresponding to the identified object type(s) and provides the one or more vectors to the concatenation module 60 and the bounding boxes 110 as the one or more image-based outputs 130 (e.g., the object type module 54 performs one-hot encoding routines to generate one or more n-bit vectors representing the identified object types, where n corresponds to the number of detectable object types). Furthermore, the one or more vectors may also correspond to regions outside of the bounding boxes 110 (e.g., one or more n-bit vectors having a value of "0").

To perform the functionality described herein, it should be understood that the assignment module 40 and the CNN module 50 may be trained using known training routines. As an example, the assignment module 40 and the CNN module 50 are trained using a multi-task loss routine that adjusts one or more parameters of the assignment module 40 and the CNN module 50 based on a 3D point proposal loss, which is a function of binary segmentation loss and a regression loss, and a bounding box refinement loss, which is a function of a confidence estimation loss and the regression loss. Accordingly, when the assignment module 40 is sufficiently trained, the assignment module 40 is configured to autonomously generate the 3D data points 80 associated with the lidar data and assign the 3D data points 80 to the given echo group 90, as described above. Furthermore, when the CNN module 50 is sufficiently trained, the CNN module 50 is configured to autonomously generate the bounding boxes 110 and one or more vectors corresponding to the identified object types of the objects 120.

In one form, the concatenation module 60 concatenates the one or more image-based outputs 130 and the echo groups 90 to generate a plurality of fused outputs 140. As an example, the concatenation module 60 appends, for each of the bounding boxes 110 and corresponding vector identify- In one form, the object identification module 70 identifies the one or more objects 120 based on the fused outputs 140 and includes an adjustment module 72 and a classification module 74. The adjustment module 72 selectively adjusts the one or more bounding boxes 110 based on the type of fused outputs 140 associated with the one or more bounding boxes 110. As an example, the adjustment module 72 adjusts a given bounding box 110 when at least one corresponding fused output 140 includes an echo group 90 assigned to the penetrable set. As another example, the adjustment module 72 does not adjust the given bounding box 110 when none of the corresponding fused outputs 140 includes an echo group 90 assigned to the penetrable set (i.e., each echo group 90 belongs to the impenetrable set).

In one form, the adjustment module 72 adjusts the dimensions of each bounding box 110 such that it encapsulates the 3D data points 80 that are assigned to the penetrable set. As an example, the adjustment module 72 adjusts: the dimensions of the bounding box 110-1 to only encapsulate 3D data points $80_1$-$80_{39}$, the dimensions of the bounding box 110-2 to only encapsulate 3D data points $80_{101}$-$80_{143}$, the dimensions of the bounding box 110-3 to only encapsulate 3D data points $80_{190}$-$80_{252}$, the dimensions of the bounding box 110-4 to only encapsulate 3D data points $80_{313}$-$80_{555}$. As another example, the adjustment module 72 partitions the bounding boxes 110 into additional bounding boxes that individually encapsulate 3D data points $80_1$-$80_{39}$, $80_{101}$-$80_{143}$, $80_{190}$-$80_{252}$, and $80_{313}$-$80_{555}$.

In one form, classification module 74 classifies, for each object 120, the object based on the estimated object type and the corresponding bounding box 110 (e.g., the bounding box 110 as adjusted by the adjustment module 72). As an example, when the bounding box 110 is adjusted by the adjustment module 72, the classification module 74 updates the estimated object type by determining one or more metrics associated with the adjusted bounding box 110 using known image processing routines. Subsequently, the classification module 74 classifies the detected object 120 by correlating the metrics to an object classification-metric table defined during a training routine of the classification module 74. As another example, when the bounding box 110 is not adjusted by the adjustment module 72, the classification module 74 classifies the object type as the estimated object type determined by the CNN module 50.

Accordingly, the object identification module 70 utilizes the fused output to authenticate the estimated object types derived by the CNN module 50. That is, concatenating the image-based outputs 130 with the echo groups 90 and/or corresponding assigned set enables the controller 20 to enhance the accuracy of object detection routines as opposed to conventional object routines individually utilizing the 3D data points 80 or the image-based outputs 130. To perform the functionality described herein, it should be understood that object identification module 70 may be trained using known CNN training routines.

Figure 5:
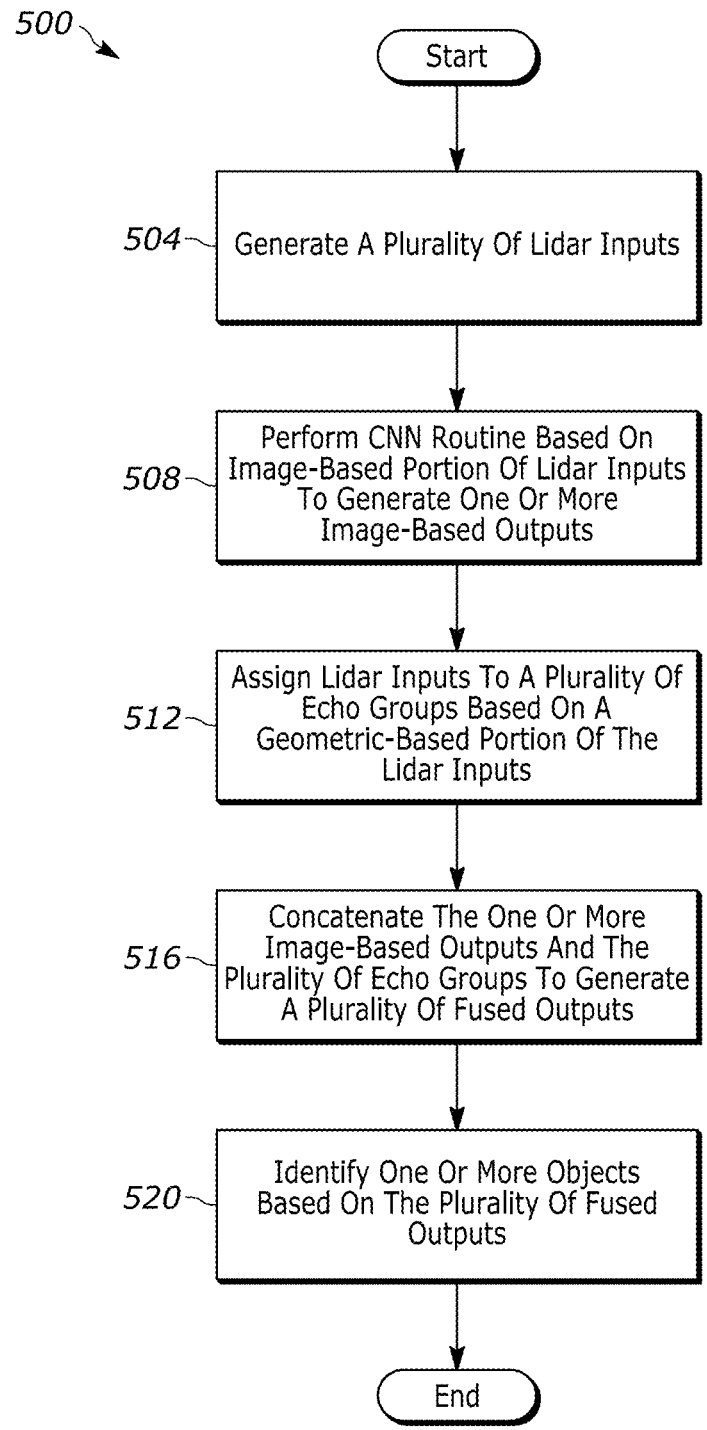
FIG. 5 is a flowchart of an example control routine in accordance with the teachings of the present disclosure.

Referring to FIG. 5, a flowchart illustrating a routine 500 for detecting one or more objects 120 based on lidar data is shown. At 504, the controller 20 generates a plurality of lidar inputs based on the lidar data. At 508, the controller 20 performs a CNN routine based on the image-based portion of the lidar inputs to generate one or more image-based outputs 130. At 512, the controller 20 assigns the lidar data to a plurality of echo groups 90 based on the geometric-based portion of the lidar inputs. At 516, the controller 20 concatenates the one or more image-based outputs 130 and the echo groups 90 to generate the fused outputs 140. At 520, the controller 20 identifies the one or more objects 120 based on the fused outputs 140.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for detecting one or more objects based on lidar data obtained from a lidar sensor of a vehicle, wherein the lidar data corresponds to an ambient environment of the vehicle, the method comprising:
generating a plurality of lidar inputs based on the lidar data, wherein:
each lidar input from among the plurality of lidar inputs comprises an image-based portion and a geometric-based portion; and
each lidar input from among the plurality of lidar inputs defines a position coordinate of the one or more objects;
performing, for each lidar input from among the plurality of lidar inputs, a convolutional neural network (CNN) routine based on the image-based portion to generate one or more image-based outputs;
assigning the plurality of lidar inputs to a plurality of echo groups based on the geometric-based portion;
concatenating the one or more image-based outputs and the plurality of echo groups to generate a plurality of fused outputs; and
identifying the one or more objects based on the plurality of fused outputs.

2. The method of claim 1, wherein the geometric-based portion defines a surface reflectance value associated with the position coordinate.

3. The method of claim 2, wherein the plurality of echo groups further comprise:
a first echo group associated with a first set of the plurality of lidar inputs having a first surface reflectance value; and
one or more additional echo groups associated with one or more additional sets of the plurality of lidar inputs having one or more additional surface reflectance values.

4. The method of claim 1, wherein assigning the plurality of lidar inputs to a plurality of echo groups based on the geometric-based portion further comprises performing, for each lidar input from among the plurality of lidar inputs, an artificial neural network (ANN) routine based on the geometric-based portion.

5. The method of claim 1, wherein:
the image-based portion defines a pixel value associated with the position coordinate; and
the image-based portion defines at least one of a light intensity value and a surface reflectance value associated with the position coordinate.

6. The method of claim 1, wherein performing the CNN routine based on the image-based portion to generate the one or more image-based outputs further comprises:
generating one or more bounding boxes, as the one or more image-based outputs, based on the image-based portion of the plurality of lidar inputs; and
determining an estimated object type associated with the one or more objects based on the one or more bounding boxes.

7. The method of claim 6, wherein identifying the one or more objects based on the plurality of fused outputs further comprises:
- selectively adjusting the one or more bounding boxes based on a type of the plurality of fused outputs associated with the one or more bounding boxes; and
- classifying, for each object from among the one or more objects, the object based on the estimated object type associated with the object and a bounding box from among the one or more bounding boxes, wherein the bounding box is associated with the object.

8. The method of claim 7, wherein the type of the plurality of fused outputs includes a penetrable type and an impenetrable type.

9. A system for detecting one or more objects based on lidar data obtained from a lidar sensor of a vehicle, wherein the lidar data corresponds to an ambient environment of the vehicle, the system comprising:
- one or more processors and one or more nontransitory computer-readable mediums storing instructions that are executable by the one or more processors, wherein the instructions comprise:
  - generating a plurality of lidar inputs based on the lidar data, wherein:
    - each lidar input from among the plurality of lidar inputs comprises an image-based portion and a geometric-based portion;
    - each lidar input from among the plurality of lidar inputs defines a position coordinate of the one or more objects; and
    - the geometric-based portion defines a surface reflectance value associated with the position coordinate;
  - performing, for each lidar input from among the plurality of lidar inputs, a convolutional neural network (CNN) routine based on the image-based portion to generate one or more image-based outputs;
  - performing, for each lidar input from among the plurality of lidar inputs, an artificial neural network (ANN) routine based on the geometric-based portion to generate a plurality of echo groups;
  - concatenating the one or more image-based outputs and the plurality of echo groups to generate a plurality of fused outputs; and
  - identifying the one or more objects based on the plurality of fused outputs.

10. The system of claim 9, wherein the plurality of echo groups further comprise:
- a first echo group associated with a first set of the plurality of lidar inputs having a first surface reflectance value; and
- one or more additional echo groups associated with one or more additional sets of the plurality of lidar inputs having one or more additional surface reflectance values.

11. The system of claim 9, wherein:
- the image-based portion defines a pixel value associated with the position coordinate; and
- the image-based portion defines at least one of a light intensity value and the surface reflectance value associated with the position coordinate.

12. The system of claim 9, wherein the instructions for performing the CNN routine based on the image-based portion to generate the one or more image-based outputs further comprise:
- generating one or more bounding boxes, as the one or more image-based outputs, based on the image-based portion of the plurality of lidar inputs; and
- determining an estimated object type associated with the one or more objects based on the one or more bounding boxes.

13. The system of claim 12, wherein the instructions for identifying the one or more objects based on the plurality of fused outputs further comprise:
- selectively adjusting the one or more bounding boxes based on a type of the plurality of fused outputs associated with the one or more bounding boxes; and
- classifying, for each object from among the one or more objects, the object based on the estimated object type associated with the object and a bounding box from among the one or more bounding boxes, wherein the bounding box is associated with the object.

14. The system of claim 13, wherein the type of the plurality of fused outputs includes a penetrable type and an impenetrable type.

15. A system for detecting one or more objects based on lidar data obtained from a lidar sensor of a vehicle, wherein the lidar data corresponds to an ambient environment of the vehicle, the system comprising:
- one or more processors and one or more nontransitory computer-readable mediums storing instructions that are executable by the one or more processors, wherein the instructions comprise:
  - generating a plurality of lidar inputs based on the lidar data, wherein:
    - each lidar input from among the plurality of lidar inputs comprises an image-based portion and a geometric-based portion;
    - each lidar input from among the plurality of lidar inputs defines a position coordinate of the one or more objects; and
    - the image-based portion defines a pixel value associated with the position coordinate and at least one of a light intensity value and a surface reflectance value associated with the position coordinate;
  - performing, for each lidar input from among the plurality of lidar inputs, a convolutional neural network (CNN) routine based on the image-based portion to generate one or more image-based outputs;
  - assigning the plurality of lidar inputs to a plurality of echo groups based on the geometric-based portion;
  - concatenating the one or more image-based outputs and the plurality of echo groups to generate a plurality of fused outputs; and
  - identifying the one or more objects based on the plurality of fused outputs.

16. The system of claim 15, wherein the geometric-based portion defines the surface reflectance value associated with the position coordinate.

17. The system of claim 16, wherein the plurality of echo groups further comprise:
- a first echo group associated with a first set of the plurality of lidar inputs having a first surface reflectance value; and
- one or more additional echo groups associated with one or more additional sets of the plurality of lidar inputs having one or more additional surface reflectance values.

18. The system of claim 15, wherein the instructions for assigning the plurality of lidar inputs to a plurality of echo groups based on the geometric-based portion further comprises performing, for each lidar input from among the plurality of lidar inputs, an artificial neural network (ANN) routine based on the geometric-based portion.

19. The system of claim 15, wherein the instructions for performing the CNN routine based on the image-based portion to generate the one or more image-based outputs further comprise:
   generating one or more bounding boxes, as the one or more image-based outputs, based on the image-based portion of the plurality of lidar inputs; and
   determining an estimated object type associated with the one or more objects based on the one or more bounding boxes.

20. The system of claim 19, wherein the instructions for identifying the one or more objects based on the plurality of fused outputs further comprise:
   selectively adjusting the one or more bounding boxes based on a type of the plurality of fused outputs associated with the one or more bounding boxes; and
   classifying, for each object from among the one or more objects, the object based on the estimated object type associated with the object and a bounding box from among the one or more bounding boxes, wherein the bounding box is associated with the object.

* * * * *